US007638560B2

United States Patent
(12) United States Patent
Narayan et al.

(10) Patent No.: US 7,638,560 B2
(45) Date of Patent: Dec. 29, 2009

(54) THERMOPLASTIC AND POLYMER FOAMS AND METHOD OF PREPARATION THEREOF

(75) Inventors: Ramani Narayan, Okemos, MI (US); Yogaraj Nabar, Mumbai (IN)

(73) Assignee: Board of Trustees of Michigan State University, East Lansing, MI (US)

(*) Notice: Subject to any disclaimer, the term of this patent is extended or adjusted under 35 U.S.C. 154(b) by 221 days.

(21) Appl. No.: 11/131,565

(22) Filed: May 18, 2005

(65) Prior Publication Data

US 2006/0111458 A1 May 25, 2006

Related U.S. Application Data

(63) Continuation-in-part of application No. 10/993,186, filed on Nov. 19, 2004.

(51) Int. Cl.

| | |
|---|---|
| ***C08J 9/00*** | (2006.01) |
| ***C08J 9/12*** | (2006.01) |
| ***C08L 3/02*** | (2006.01) |
| ***C08L 3/12*** | (2006.01) |

(52) U.S. Cl. ............................ 521/79; 521/50; 521/80; 521/81; 521/82; 521/84.1; 521/91; 521/97; 521/109.1; 521/122; 521/130; 521/134; 521/138; 523/128; 524/445; 524/449; 525/54.24; 527/300; 527/305; 527/315

(58) Field of Classification Search .................. 521/50, 521/79, 80, 81, 82, 84.1, 91, 97, 109.1, 122, 521/130, 134, 138; 523/128; 524/445, 449; 525/54.24; 527/300, 305, 315

See application file for complete search history.

(56) References Cited

U.S. PATENT DOCUMENTS

| | | | | |
|---|---|---|---|---|
| 4,026,849 | A | 5/1977 | Bagley et al. | |
| 4,673,438 | A | 6/1987 | Witter et al. | |
| 4,863,655 | A | 9/1989 | Lacourse | |
| 5,035,930 | A | 7/1991 | Lacourse | |
| 5,043,196 | A | 8/1991 | Lacourse et al. | |
| 5,095,054 | A | 3/1992 | Lay et al. | |
| 5,185,382 | A | 2/1993 | Neumann et al. | |
| 5,208,267 | A | 5/1993 | Neumann et al. | |
| 5,234,977 | A | 8/1993 | Bastioli et al. | |
| 5,256,711 | A | 10/1993 | Tokiwa et al. | |
| 5,262,458 | A | 11/1993 | Bastioli et al. | |
| 5,272,181 | A | 12/1993 | Boehmer et al. | |
| 5,275,774 | A | 1/1994 | Bahr et al. | |
| 5,280,055 | A | 1/1994 | Tomka | |
| 5,288,765 | A | 2/1994 | Bastioli et al. | |
| 5,314,934 | A | 5/1994 | Tomka | |
| 5,360,830 | A | 11/1994 | Bastioli et al. | |
| 5,382,611 | A | 1/1995 | Stepto et al. | |
| 5,405,564 | A | 4/1995 | Stepto et al. | |
| 5,412,005 | A | 5/1995 | Bastioli et al. | |
| 5,462,980 | A | 10/1995 | Bastioli et al. | |
| 5,462,983 | A | 10/1995 | Bloembergen et al. | |
| 5,496,895 | A | 3/1996 | Chinnaswamy et al. | |
| 5,500,465 | A | 3/1996 | Krishnan et al. | |
| 5,512,378 | A | 4/1996 | Bastioli et al. | |
| 5,540,929 | A | 7/1996 | Narayan et al. | |
| 5,554,660 | A | 9/1996 | Altieri et al. | |
| 5,578,691 | A | 11/1996 | Narayan et al. | |
| 5,616,671 | A | 4/1997 | Narayan | |
| 5,665,786 | A | 9/1997 | Xu et al. | |
| 5,719,214 | A * | 2/1998 | Tanaka et al. | 524/47 |
| 5,736,586 | A | 4/1998 | Bastioli et al. | |
| 5,801,207 | A | 9/1998 | Bastioli et al. | |
| 5,844,023 | A | 12/1998 | Tomka | |
| 5,854,345 | A | 12/1998 | Xu et al. | |
| 5,869,647 | A | 2/1999 | Narayan et al. | |
| 6,011,092 | A * | 1/2000 | Seppala et al. | 524/47 |
| 6,150,438 | A * | 11/2000 | Shiraishi et al. | 524/47 |
| 6,184,261 | B1 | 2/2001 | Biby et al. | |
| 6,214,907 | B1 | 4/2001 | Tomka | |
| 6,235,816 | B1 | 5/2001 | Loercks et al. | |
| 6,277,899 | B1 | 8/2001 | Bastioli et al. | |
| 6,472,497 | B2 | 10/2002 | Loercks et al. | |
| 2004/0122135 | A1* | 6/2004 | Halley et al. | 524/47 |

OTHER PUBLICATIONS

W. Wiedmann, and E. Strobel, Starch, 43, 138 (1991).
R.L. Shorgen, G.F. Fanta, and W.M. Doan, Starch, 45, 276 (1993).
P. Forssell, J. Mikkila, and T. Sourtti; J.M.S. Pure Appl. Chem., A33, 703 (1996).
R. Narayan, Polymers from Agricultural Co products, ACS Symp Ser. (1994).
J.J.G. Van Soest, K. Benes, and D.de. Wit, Polymer, 37, 3543 (1996).
G.F. Fanta and E.B. Bagley, Encyclopedia of Polymer Science and Technology, John Wiley & Sons: New York (1964).
G.F. Fanta, Block and Graft Copolymers- vol. I, John Wiley & Sons: New York (1973).
F.H. Otey, R.P. Westhoff and W.M. Doane, Industrial Engineering Chemistry Products Research Development, 19, 592 (1980).
F.H. Otey and R.P. Westhoff, Industrial Engineering Chemistry Products Research Development, 23, 284 (1984).
F.H. Otey, R.P. Westhoff and W.M. Doane, Industrial Engineering Chemistry Products Research Development, 26, 1659 (1987).
"Starch: Chemistry and Technology", Chapter XIII (H. Roberts, "Starch Derivatives") and Chapter XV (L. Kruger et al., "Production and Uses of Starch Acetates"), Academic Press (1967).
"Encyclopedia of Polymer Science and Engineering", vol. 6, 1986, pp. 571 to 631.
"Starch Chemistry and Technology" Chapter X (M. Ruthenberg, "Starch Derivatives") Academic Press (1984).

* cited by examiner

*Primary Examiner*—Ana L Woodward
(74) *Attorney, Agent, or Firm*—Ian C. McLeod

(57) ABSTRACT

A foamed starch-polyester graft copolymer and chemically modified starch-polyester graft copolymer composition comprising a chemically modified starch or chemically modified starch-nanoclay product is described. The composition can be produced continuously in a twin-screw co-rotating extruder in the presence of a blowing agent. The foams are biodegradable.

23 Claims, 10 Drawing Sheets

THERMOPLASTIC AND POLYMER FOAMS AND METHOD OF PREPARATION THEREOF

CROSS-REFERENCE TO RELATED APPLICATIONS

This application is a continuation-in-part of U.S. patent application Ser. No. 10/993,186, filed Nov. 19, 2004.

STATEMENT REGARDING FEDERALLY SPONSORED RESEARCH OR DEVELOPMENT

Not Applicable.

STATEMENT REGARDING GOVERNMENT RIGHTS

None

BACKGROUND OF THE INVENTION (1) Field of the Invention

The present invention relates to thermoplastic polymer foams prepared from starch-polyester graft copolymers. The present invention particularly relates to foams prepared with a chemically modified starch-polyester graft copolymer or a chemically modified starch-nano clay polyester graft copolymer and a thermoplastic polymer other than the copolymer. A preferred process of making these thermoplastic polymer foams using extrusion is disclosed. The foams have improved processability, surface properties, and an extended range of mechanical properties.

(2) Description of Related Art

Plastic packaging is subjected to pressure from existing and proposed environmental and disposal regulations, and market based sustainability initiatives. It presents a major disposal problem for companies and municipalities as it is lightweight and bulky and so does not lend itself to a viable economic and environmentally responsible recycling operation due to expensive handling and transportation costs. It is not biodegradable, which makes disposal in soil or composting operations untenable. Further, issues such as sustainability, industrial ecology, biodegradability, and recyclability are becoming major considerations in a company's product packaging design, especially with single use disposable packaging.

Natural biopolymers provide biodegradable, sustainable solutions for the manufacture of short-life, single use disposable packaging, consumer goods, and marine plastics. Starch, an anhydroglucose polymer, offers a structural platform to manufacture sustainable, biodegradable packaging. Examples of patents that disclose the manufacture of starch and blends of starch and other polymers include U.S. Pat. No. 4,673,438 to Wittwer et al.; U.S. Pat. No. 4,095,054 to Lay et al.; U.S. Pat. No. 5,256,711 to Tokiwa et al.; U.S. Pat. No. 5,275,774 to Bahr et al.; U.S. Pat. No. 5,382,611 to Stepto et al. and U.S. Pat. No. 5,405,564 to Stepto et al. Lately, there have been business reports of the use of thermoplastic starch (TPS) as a component in multi phase blends (W. Wiedmann, and E. Strobel, *Starch,* 43, 138 (1991); R. L. Shorgen, G. F. Fanta, and W. M. Doan, *Starch,* 45, 276 (1993); P. Forssell, J. Mikkila, and T. Sourtti, *J.M.S. Pure Appl. Chem*., A33, 703 (1996); R. Narayan, *Polymers from Agricultural Co products*, ACS Symp Ser. (1994); and J. J. G. Van Soest, K. Benes, and D. de. Wit, *Polymer,* 37, 3543 (1996). Still others have manufactured thermoplastic starch blends in which native starch is initially blended with a small quantity of water and a less volatile plasticizer such as glycerin in order to form starch melts that are subjected to a degassing procedure prior to cooling and solidification in order to remove substantially all of the water therefrom. Examples of such patents include U.S. Pat. Nos. 5,412,005, 5,280,055, 5,288,765, 5,262,458, 5,462,980 and 5,512,378 to Bastioli et al.

Starch granules exhibit hydrophilic properties and strong inter-molecular association via hydrogen bonding due to the hydroxyl groups on the granule surface. The hydrophilicity and thermal sensitivity render the starch polymer unsuitable for thermoplastic applications. In this respect, some authors have emphasized on finding the optimal polymer or mixture of polymers and other admixtures in order to thereby "optimize" the properties of the starch. One drawback is that most of the polymers and other admixtures are themselves significantly more expensive than starch, which tend to increase the cost of such polymer blends compared to starch melts. Another drawback is that such additives will only be able to marginally alter the mechanical properties of the starch/polymer blends when viewed from a materials science perspective.

In order to improve on these drawbacks, graft copolymerization of vinyl monomer on the starch backbone was used to modify starch. Fanta and Bagley have reviewed the synthesis and discussed some applications of starch graft copolymers (G. F. Fanta and E. B. Bagley, *Encyclopedia of Polymer Science*, John Wiley & Sons: New York (1970); and G. F. Fanta, *Block and Graft Copolymers—Vol I*, John Wiley & Sons: New York (1973). Otey et al. (F. H. Otey, R. P. Westhoff and W. M. Doane, *Industrial Engineering Chemistry Products Research Development,* 19, 592 (1980); F. H. Otey and R. P. Westhoff, *Industrial Engineering Chemistry Products Research Development,* 23, 284 (1984); and F. H. Otey, R. P. Westhoff and W. M. Doane, *Industrial Engineering Chemistry Products Research Development,* 26, 1659 (1987)) blended starch with poly(ethylene-co-acrylic acid) (EAA). In these papers, the authors suggested the formation of hydrogen bonds between the carboxylic group in EAA and the hydroxyl group in starch. Increasing the level of starch decreased the percentage elongation of the film and increased the diffusion rate of water. Similar complexes like EAA can also be formed with the hydroxyl groups of the polyethylene-vinyl alcohol (EVOH) copolymer. U.S. Pat. No. 5,462,983 to Bloembergen at al. reports on blends and alloys containing lignocelluloses like starch, cellulose acetate and the like. U.S. Pat. No. 5,314,934 to Tomka et al. provides a process to produce a polyolefin-starch polymer blend. Ethylene/acrylate/maleic anhydride terpolymer was used as a compatibilizer. These blends were reported to be blown into film with properties comparable to low density polyethylene (LDPE). U.S. Pat. No. 5,234,977 to Bastioli et al. discloses a material used for the production of biodegradable articles in film, sheet or fiber form, which can be produced by extrusion from a molten mass that includes a synthetic thermoplastic polymer and a destructured starch to which a boron containing compound such as boric acid has been added. U.S. Pat. No. 6,277,899 to Bastioli et al. discloses a polymeric composition comprising filler melt-dispersed in a matrix comprising, a destructurized starch component, a synthetic thermoplastic polymeric component and a fluidizing agent. U.S. Pat. No. 5,412,005 to Bastioli et al. discloses biodegradable polymeric compositions containing a starch based component and a polymeric component, preferably polymers of ethylene-vinyl alcohol or polyvinylalcohol.

U.S. Pat. Nos. 6,235,816 and 6,472,497 describe starch polyester blends.

Other references are:

(1) Ramani Narayan, Steven Bloembergen and Amit Lathia, A Method of Preparing Biodegradable Modified-Starch Moldable Products and Films, U.S. Pat. No. 5,869,647, Feb. 9, 1999, July 1993;

(2) Narayan, R., Biodegradable Multi-Component Polymeric Materials Based on Unmodified Starch-Like Polysaccharides, U.S. Pat. No. 5,500,465, Oct. 31, 1995;

(3) Narayan, R., Krishnan, M., DuBois, P., Polysaccharides Grafted With Aliphatic Polyesters Derived From Cyclic Esters, U.S. Pat. No. 5,540,929, Jul. 30, 1996;

(4) Narayan, R., Krishnan, M., DuBois, P., Polysaccharides Grafted With Aliphatic Polyesters Derived From Cyclic Esters, U.S. Pat. No. 5,578,691, Nov. 26, 1996;

(5) Narayan, R., Krishnan, M., DuBois, P., Polysaccharides Grafted With Aliphatic Polyesters Derived From Cyclic Esters, U.S. Pat. No. 5,616,671, Apr. 1, 1997;

Starch-based foams have been developed before using biodegradable polymers as additives/processing aids in order to impart better physico-mechanical properties such as lower density, better resilience, higher hydrophobicity.

U.S. Pat. No. 4,863,655 (1989), U.S. Pat. No. 5,035,930 (1991) and U.S. Pat. No. 5,043,196 (1991) all issued to N. Lacourse et al, showed the extrusion of starch having high amylose content of at least 45% by weight into expanded packaging products. A difficulty with the product described by U.S. Pat. No. 4,863,655, is that the expanded amylase starch material is not, by itself, suitable for preparing containers where moisture resistance is a necessary property (e.g. various take-out food containers).

U.S. Pat. No. 5,095,054 issued to G. Lay et al (1992) discloses thermoplastic polymer compositions comprising destructurized starch with a variety of thermoplastic polymer materials. Processing aids such as polyolefins, polyesters, polyethers, polycarbonates, polyacetals, vinyl polymers, etc. The patent further discloses processes for forming such compositions into shaped articles. Although these blends and articles made therefrom are said to show an improved dimensional stability in humid air when compared with non-blended destructurized starch, nevertheless the articles are said to retain a high degree of disintegration in contact with liquid water. Although this disintegration may assist in disposal of such articles in landfills and the like, the high degree of disintegration in contact with liquid water is disadvantageous for many applications where substantial moisture is present.

U.S. Pat. Nos. 5,185,382 and 5,208,267 issued to P. Neumann et al (1993) discloses a foamed starch product, using wheat/corn starches with polyalkylene glycols or derivatives thereof.

U.S. Pat. No. 5,272,181 issued to Boehmer et al (1993) a starch-graft polymer is combined with a starch to form a composition which may be expanded into foam products ranging from rigid to resilient. The starch-graft copolymer was obtained which had been manufactured in accordance with U.S. Pat. No. 4,026,849. This starch-graft copolymer was prepared by grafting a monomer methyl acrylate onto an unmodified basic corn starch (20% amylose) under relatively severe conditions. These materials are said to readily disintegrate under wet conditions. Although such disintegration may assist in integrating the materials into soil, the disclosed materials are not entirely biodegradable due to the presence of the synthetic resins (such as polyacrylate).

U.S. Pat. No. 5,288,765 (1994); U.S. Pat. No. 5,360,830 (1994); U.S. Pat. No. 5,736,586 (1998); and U.S. Pat. No. 5,801,207 (1998) granted to Bastioli et al disclose starch foams made by using 10-30% of polymers such as PVA, poly(caprolactone), cellulose acetate, poly(ethylene vinyl alcohol), and poly(ethylene-co-acrylic acid).

U.S. Pat. No. 5,554,660 issued to P. Altieri et al (1996) discloses an expanded foamed starch product with improved water/humidity resistance comprising the combination of starch/modified starch with starch esters.

U.S. Pat. No. 5,496,895 issued to Chinnaswamy et al (1996) discloses biodegradable polymers and methods of making them from non-biodegradable polymers such as petroleum-based plastics combined with other biodegradable polymers, such as for example, carbohydrates, proteins, lipids or the like. These formulations were used for manufacturing loose-fill.

U.S. Pat. No. 5,665,786 (1997) and U.S. Pat. No. 5,854,345 (1998) issued to Xu et al disclose expanded articles having a compressible and resilient body including starch or a modified starch and a water insoluble, synthetic polymer, preferably a hydroxyl-functional polymer.

U.S. Pat. No. 6,184,261 granted to Biby et al discloses a starch foam using a biodegradable polymer that is selected from the group consisting of poly(tetramethylene adipate-co-terephthalate) and a resin comprised of 10-50% by weight ethylene acrylic acid copolymer.

Objects

It is an object of the present invention to provide foams with good compatibility between the starch and the polyester, providing better physical properties such as density and surface finish, and mechanical properties such as compressive strength and resilience. Further, it is an object to provide processable products, which are also biodegradable. Further still, it is an object to provide new starch-based foam materials, which utilize agricultural resources and return those resources to nature in an environmentally sound manner. It is further an object of the present invention to provide foams comprising novel grafted starch polyester compositions which have novel properties. It is further an object of this invention to provide economical and reproducible compositions. These and other objects will become increasingly apparent from the following description.

SUMMARY OF THE INVENTION

The present invention relates to an extruded thermoplastic polymer foam which comprises a blend of (a) starch-polyester graft copolymer composition comprising starch or chemically modified starch with segments of a polyester grafted onto the starch; and (b) a thermoplastic polymer other than the copolymer which forms the blend with the copolymer composition, wherein the foam is extruded in the presence of a blowing agent, preferably water. Preferably the chemically modified starch is a starch which is thermoplastic. Preferably the composition comprises about 0.5 to 25% by weight of the composition of a plasticizer. Preferably the composition comprises a natural or an organically modified nanoclay. Preferably the starch is selected from the group consisting of corn, potato, wheat, rice, sago, tapioca, waxy maize, sorghum and high amylase starch. Preferably the starch is a chemically modified starch and is prepared from a reactively extruded 50% to 80% by weight of the starch, a chemical modifier from 0.5% to about 10% by weight of the starch, a plasticizer from 10 to 50 wt-% of the composition, and optionally a free radical initiator in an amount ranging between 001 to 2.0 wt % of the composition. Preferably the composition is prepared from a blend comprising starch polymer from 50% to 80% by weight, a chemical modifier from 0.5% to about 10% by weight of the starch polymer, more preferably from 2% to 5% by weight of the starch, a plasticizer from 10 to 50 wt-% of the composition, a nanoclay, wherein the nanoclays are added in an amount ranging from 0.5 to 25 wt % of the total composition. Preferably the polyester is selected from the group consisting of:

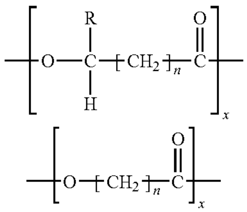

where R is lower alkyl and aromatic groups containing 1 to 12 carbon atoms; n is 0 to 10; and x is 200 to 2000; and

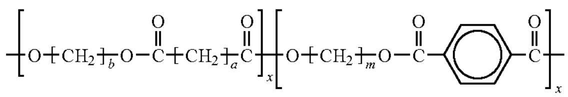

where a, b and m are 2 to 8; and x/y is between 3/2 and 10/1. Preferably the polyester is 50 to 90 wt-% of the composition. Preferably the plasticizer is polyhydric alcohol. Preferably a modifier for the chemically modified starch is selected from the group consisting of dibasic acids and their anhydrides. Preferably the composition comprises a free radical initiator. Preferably the free radical initiator is a peroxide. Preferably the composition comprises a nanoclay selected from a group consisting of montmorillonite, smectite, hectorite, and mixtures thereof. Most preferably the composition is completely biodegradable. Preferably the composition has been grafted in a melt phase in an extruder. Most preferably the composition has been grafted in a twin screw extruder at a temperature in the range of 100° C.-200° C. prior to foaming.

The present invention also relates to a process for the preparation of a thermoplastic polymer foam which comprises: (a) preparing a starch polyester graft co-polymer composition which comprises blending a mixture of an organic acid or anhydride of the acid with starch or a chemically modified starch and a polyester at a temperature which grafts the segments of a polyester onto the starch to form the composition; and (b) thermoplastically foaming the composition with a blowing agent, preferably with water, during or after step (a). In the process, preferably the blending is in an extruder at a temperature between about 100 to 200° C. In the process, preferably the organic acid is a dibasic acid. In the process, most preferably the organic acid is a dibasic acid produced in situ in the blending by reaction of an anhydride with water contained in the starch. In the process, preferably the composition in addition comprises a plasticizer. In the process, preferably in addition, a peroxide initiator is mixed into the blend. In the process, preferably in addition, a nanoclay is in the blend.

The present invention also relates to an extruded thermoplastic polymer foam which comprises a blend of (a) a starch based copolymer composition which comprises a reactively extruded mixture of a biodegradable starch polymer, a chemical modifier selected from the group consisting of a dibasic organic acid, an organic anhydride of a dibasic organic acid and mixtures thereof, a plasticizer, a biodegradable polyester, and optionally a free radical initiator; and (b) a thermoplastic polymer other than the copolymer composition which forms a blend with the copolymer composition, wherein the mixture has been extruded with a blowing agent, preferably water, with heating and subsequent venting of water from the mixture. Preferably the starch is selected from the group consisting of cornstarch, potato starch, tapioca starch, rice starch, wheat starch, and cassava starch. Preferably the starch is about 5% to 90% by weight of the mixture. Preferably the starch is an unmodified, oxidized or thin boiling starch of 0 to 95 degree of fluidity. Preferably the starch has moisture content of about 0.5% to 15% by weight. Preferably the starch is in a pulverized form. Preferably the polyester is selected from the group consisting of:

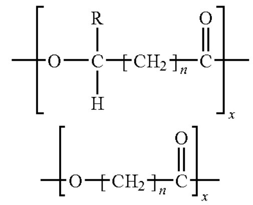

where R is lower alkyl and aromatic groups containing 1 to 12 carbon atoms; n is 0 to 10; and x is 200 to 2000; and

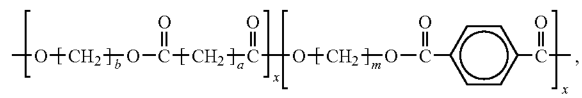

where a, b and m are 1 to 8; and x/y is between 3/2 and 10/1. Preferably the polyester is 50 to 90 wt-% of the composition. Preferably the plasticizer is selected from the group consisting of polyhydric alcohols like glycerol, sorbitol, ethylene glycol and mixtures thereof. Preferably the composition comprises a polyhydroxy organic plasticizer in an amount between 10 to 70 wt-% of the mixture. Preferably the chemical modifier is a cyclic dibasic acid anhydride. Preferably the organic anhydride or organic acid is selected from the group consisting of maleic-, succinic-, itaconic-, phthalic- and mixtures thereof. Preferably the starch is from 50% to 80% by weight of the mixture.

Finally, the present invention relates to a process for the preparation of a thermoplastic foam: (a) providing a starch based composition which comprises reactively extruding a mixture which comprises a mixture of a biodegradable starch polymer, a chemical modifier selected from the group consisting of a dibasic organic acid, an organic anhydride of a dibasic organic acid and mixtures thereof, a plasticizer, a biodegradable polyester resin, and optionally a free radical initiator, wherein the mixture has been extruded, with heating and venting of water from the mixture; and (b) extruding the composition with a thermoplastic polymer other than the mixture of step (a) in the presence of a blowing agent, preferably water, and a plasticizer to produce the foam.

Blowing agents are well known to those skilled in the art. Typically they are or become gaseous when heated to form the cells in the foam.

The present invention uses new amphiphilic, starch-polyester graft copolymer and chemically modified starch-polyester graft copolymer compositions comprising a chemically modified starch or chemically modified starch-nanoclay product produced continuously in a twin-screw co-rotating extruder. The chemically modified plasticized starch product with lower viscosity and good processability and the chemically modified plasticized starch-nanoclay product is described in copending patent application Ser. No. 10/993,186, filed Nov. 19, 2004. The starch-polyester graft copolymers of the present invention can be readily foamed. Examples of biodegradable polyesters include poly(caprolactone) (PCL), poly(vinylacetate-co-vinylalcohol) (PVAc/VA), poly(lactic acid) or polylactide (PLA), poly(glycolic acid) or polyglycolide (PGA), and related copolyesters including the various combinations of stereoisomers, bacterial and synthetic poly(β-hydroxybutyrate) (PHB), Poly(β-hydroxybutyrate-co-β-hydroxyvalerate) (PHB/V), and other poly(β-hydroxyalkanoates) (PHA), biodegradable aliphatic polyesters, and aliphatic-aromatic copolyesters. Preferably the polyester is selected from the group consisting of the composition in which the polyester is selected from the group consisting of:

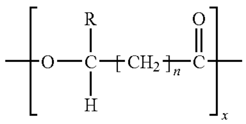

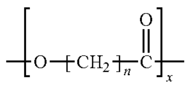

where R is lower alkyl and aromatic groups containing 1 to 12 carbon atoms; n is 0 to 10; and x is 200 to 2000; and

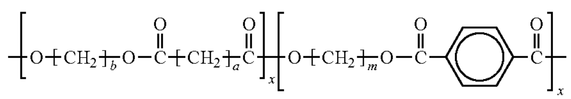

where a, b and m are 2 to 8; and x/y is between 3/2 and 10/1.

The present invention provides new foamed polymeric materials, which are environmentally responsible and fully biodegradable as per ASTM standards.

DETAILED DESCRIPTION

Figure 1:
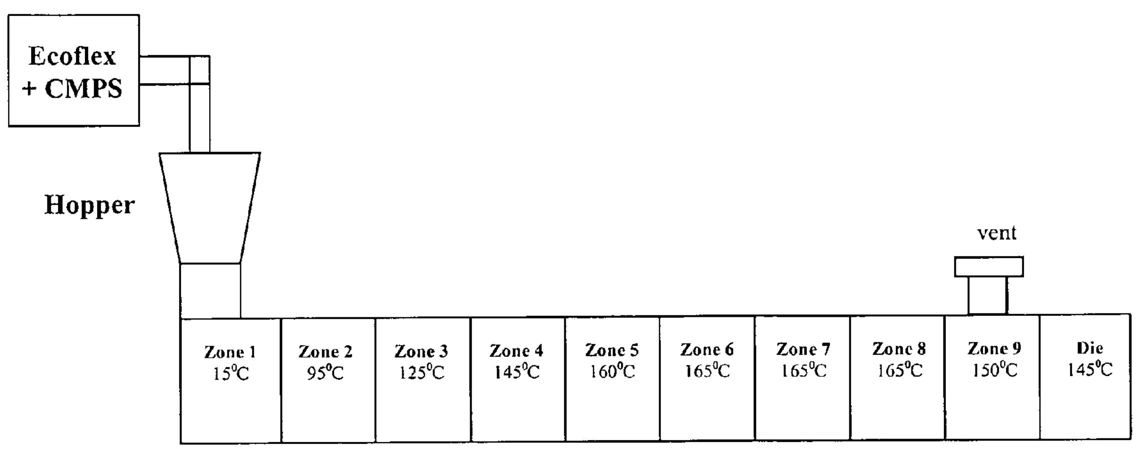
FIG. 1 is a diagram of an extrusion apparatus for the production of polyester grafted starch.

The starting starch material useful in this invention can be any of several starches, native or modified. Such starches include those derived from any plant source including corn, potato, wheat, rice, sago, tapioca, waxy maize, sorghum and high amylose starch, i.e., starch having at least 40% and more particularly at least 65% by weight of amylose content, such as high amylose corn, etc. Starch flours can also be used as a starch source. Also included are the conversion products derived from any of the former bases including, for example, dextrin prepared by hydrolytic actions of acid and/or heat; oxidized starches prepared by treatment with oxidants such as sodium hypochlorite; fluidity or thin boiling starches prepared by enzyme conversion or mild acid hydrolysis; and derivatized and crosslinked starches. The starch percentage in the final blend is 5% to 45% by weight and preferably from 10% to 30% by weight.

The plasticizers are polyhydric alcohols, preferably glycerol sorbitol, ethylene glycol and mixtures thereof. Plasticizer concentration in the final blend is 5% to 50% by weight and preferably from 5% to 20% by weight is preferred.

Modified starches could also be used in this invention. By modified it is meant that the starch can be derivatized or modified by typical processes known in the art, e.g., esterification, etherification, oxidation, acid hydrolysis, crosslinking and enzyme conversion. Typically, modified starches include esters, such as the acetate and half-esters of dicarboxylic acids, particularly the alkenylsuccinic acids; ethers, such as the hydroxyethyl and hydroxypropyl starches and cationic starches such as starch modified with 2-diethylaminoethyl chloride (DEC) and starch modified with quaternary ammonium reagents such as 3-chloro-2-hydroxypropyltrimethylammonium chloride; starches oxidized with hypochlorite; starches reacted with crosslinking agents such as phosphorus oxychloride, epichlorohydrin, and phosphate derivatives prepared by reaction with sodium or potassium orthophosphate or tripolyphosphate and combinations thereof. These and other conventional modifications of starch are described in publications such as "Starch: Chemistry and Technology", Second Edition, Edited by Roy L. Whistler, et al., chapter X; Starch Derivations: Production and Uses by M. W. Rutenberg, et al., Academic Press, Inc. 1984.

Examples of biodegradable polyester polymers include poly(caprolactone) (PCL), poly(vinylacetate-co-vinylalcohol) (PVAc/VA), poly(lactic acid) or polylactide (PLA), poly (glycolic acid) or polyglycolide (PGA), and related copolyesters including the various combinations of stereoisomers, bacterial and synthetic poly(-hydroxybutyrate)poly(β-hydroxybutyrate-co-β-hydroxyvalerate) (PHB/V), and other poly(β-hydroxyalkanoates) (PHA), and aliphatic-aromatic biodegradable polyesters such as ECOFLEX™.

In forming starch-polyester graft copolymers of this invention, the selected starch starting material is preferably reacted with biodegradable polyester polymers in the presence of maleic anhydride or maleic acid or mixtures thereof, which functions as a trans-esterification catalyst.

The maleic anhydride and/or its hydrolyzed acid counterpart is combined with the starch or the plasticized starch in an amount of from about 0.1 to 10% by weight of anhydride (or acid) and preferably about 0.5 to 4% anhydride (or acid) based on the dry weight of starch. The anhydride or hydrolyzed acid is usually added in the form of a fine powder and is co-extruded with the biodegradable polyester by adding it directly to the extruder. In the case of using maleated starches, maleic anhydride already present in the system functions as a catalyst and hence there is no need to add again. Other organic diacids or anhydrides can be used as described in our copending application, which is incorporated herein by reference.

While any starch may be used in this invention as noted previously, the starch materials that are particularly useful in this invention are corn, potato, tapioca and high amylose starch; i.e., starch containing at least 40% by weight and preferably at least 65% by weight of amylose. Further preferred are the starches that are modified by maleation, especially using maleic anhydride or maleic acid. Blends of two or more of the starch starting materials may be used as well as additive or synthetic compounds to improve properties such as water resistance, strength, flexibility, color, and the like.

The apparatus used in carrying out the extrusion process can be any screw type extruder. While the use of a single or twin screw extruder can be used, it is preferred to use a twin-screw extruder. Such extruders will typically have rotating screws in a horizontal cylindrical barrel with an entry port mounted over one end and a shaping die mounted at the discharge end. When twin screws are used, they may be co-rotating and intermeshing or non-intermeshing. Each screw will comprise a helical flight or threaded sections and typically will have a relatively deep feed section followed by a tapered transition section and a comparatively shallow constant-depth meter section. The motor driven screws, generally fit snugly into the cylinder or barrel to allow mixing, heating and shearing of the material as it passes through the extruder.

Control of the temperature along the length of the extruder barrel is important and is accomplished in zones along the length of the screw. Heat exchange means, typically a passage such as a channel, chamber or bore located in the barrel wall, for circulating a heated media such as oil, or an electrical heater such as calrod or coil type heaters, are often used. Additionally, heat exchange means may also be placed in or along the shaft of the screw device.

Variations in any of the elements used in the extruder can be made as desired in accordance with conventional design practices. A further description of extrusion and typical design variations can be found in "Encyclopedia of Polymer Science and Engineering", Volume 6, 1986, pp. 571 to 631.

In carrying out the extrusion process, temperatures in the extruder vary depending on the particular material, desired properties and application. They generally range from about 100° C. to 250° C., and preferably will range from about 150° C. to 210° C. The total moisture content of the starch in the extruder, i.e., moisture present in the inlet feed starch as well as water in the aqueous anhydride and/or acid, is about 25% or less by weight, based on the weight of starch. More particularly, the total moisture content of the starch ranges from about 8 to 25% preferably about 10 to 21% and more preferably from about 15 to 21% by weight, based on the weight of starch.

Further, the starch-polyester graft copolymers can be manufactured in a one-unit process; wherein the starch is first plasticized in a first section of the extruder followed by addition of the polyester along-with a trans-esterification catalyst to form the starch-polyester graft copolymer. Further, starch can be maleated using maleic anhydride or maleic acid in the presence of glycerol plasticizer in the first section of the extruder, followed by addition of the polyester downstream to form the starch-polyester graft copolymer.

By utilizing the starch-polyester graft copolymer, the overall processing temperature can be reduced to well below the processing temperature of the pure polyester component. This is particularly important for manufacturing with high-melting polyesters such as PHB and PHB/V, which thermally degrade at higher processing temperatures and therefore have a narrower processing window. This improvement is attributed to the compatibility achieved by the reactive blending process, resulting in changes in the crystalline microstructure of the polyester component and/or the morphology of the multi-phase material thereby rendering it processable at lower processing temperatures. It is important that the compounds be compatible.

The compositions of the present invention can retain their biodegradability if a degradable polyester polymer is used. The water resistance of the starch and modified starches is improved by graft copolymerization with high molecular weight biodegradable polyesters, especially with semi-crystalline polyesters such as PCL or PHB/V, and similar biodegradable polyesters. This is further achieved by engineering the appropriate blend composition, through the choice of polyester, starch and plasticizer.

The present invention can be processed by various methods known in the art, such as extrusion pelletizing, injection molding, and film forming. For example, the starch-polyester graft copolymer compositions made in accordance with the present invention can be injection molded to give a variety of molded products, and extrusion cast or even solution cast to give translucent flexible films, as well as transparent films.

The following experimental examples demonstrate the utility of the present invention for forming biodegradable foam products containing a biodegradable starch or plasticized starch and biodegradable polyester in the presence of a trans-esterification catalyst.

Examples 1 to 8 show the preparation of the starch polyester graft-co-polymer compositions.

Example 1

Ser. No. 10/993,186

Figure 2A:
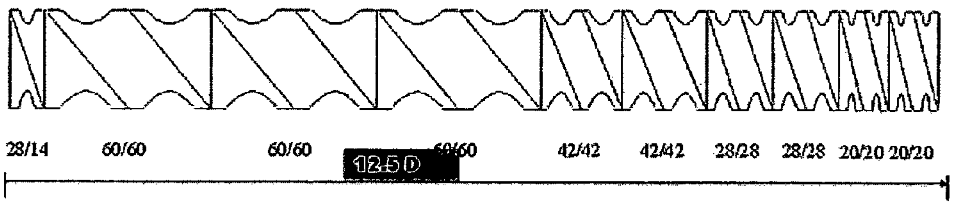
FIGS. 2A, 2B and 2C are drawings depicting the screw configuration used for the reactive extrusion production of the novel graft copolymers. The screw configuration is divided into three sections (FIG. 2A) followed by (FIG. 2B) and further followed by (FIG. 2C).
Figure 2B:
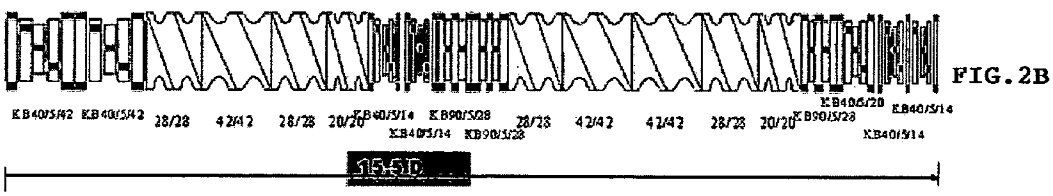
Figure 2C:
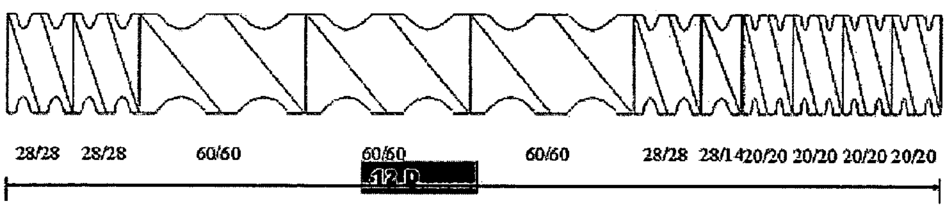

The synthesis of ECOFLEX™(PBAT)—plasticized starch (PS) graft copolymers was accomplished in a twin-screw co-rotating CENTURY extruder using maleic acid as a trans-esterification catalyst. PS was produced by plasticization of regular corn-starch, obtained from Corn Products, Inc. (Chicago, Ill.) (moisture content of 12%) using glycerol (20-wt %) as a plasticizer in the same extruder. Maleic acid, obtained from Aldrich, was ground to a fine powder using a mortar and pestle and pre-blended with the ECOFLEX™ polyester (poly (butylene adipate-co-terephthalate)), obtained from BASF (Germany)) before being fed to the feed port of the extruder. The concentration of maleic acid used was 1-wt % with respect to the total concentration. Meanwhile, PS, previously oven dried overnight at 50° C., was ground to a fine powder and fed using an external feeder to the feed port of the extruder. The feeder rates were adjusted accordingly to obtain a ratio of 70:30 (ECOFLEX™+Maleic acid):PS. The temperature profile is shown in FIG. 1 and Table 1, and the screw configuration used is shown in FIG. 2, respectively. In FIGS. 2A, 2B and 2C, the entire screw configuration is divided into 3 sections; section 1 of 12.5 D distance followed by section 2 of 15.5 D distance and finally section 3 with 12 D distance. The vent port was kept open to remove unreacted maleic acid and water. The extruded strand was cooled using a water bath and pelletized in line.

TABLE 1

Extrusion Processing Conditions in the synthesis of ECOFLEX-(PS/CMPS) graft copolymers

| ZONE | SET | ACTUAL | UNITS |
|---|---|---|---|
| ZONE1 | 15 | 70 | C. |
| ZONE2 | 95 | 99 | C. |
| ZONE3 | 125 | 122 | C. |
| ZONE4 | 145 | 149 | C. |
| ZONE5 | 160 | 170 | C. |
| ZONE6 | 165 | 192 | C. |
| ZONE7 | 165 | 196 | C. |
| ZONE8 | 165 | 193 | C. |
| ZONE9 | 150 | 185 | C. |
| DIE | 145 | 153 | C. |
| MELT TEMP. | | 153 | C. |
| MOTOR SPEED | | 254 | RPM |
| TORQUE | | 67 | % |
| PRESSURE | | 92 | Psia |
| FEEDER SPEED, CENTURY (Ecoflex + Maleic acid) | | 135 (~8 lb/hr) | % |
| FEEDER SPEED, MINI | | | % |
| FEEDER SPEED, EXT (TPS) | | 0.80 (3.4 lb/hr) | % |

Figure 3:
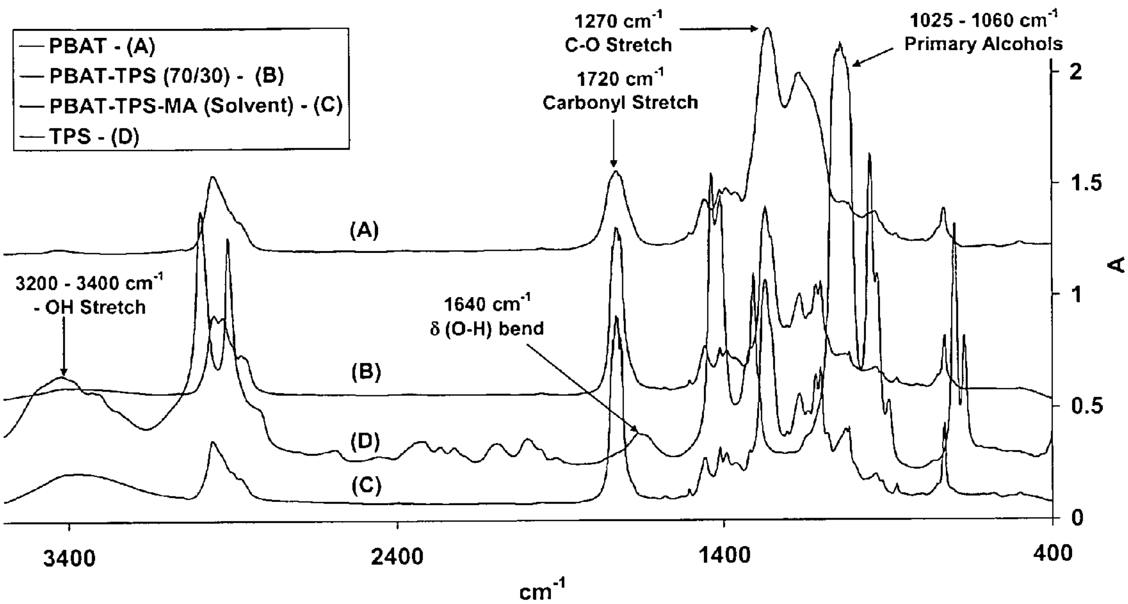
FIG. 3 is a graph showing the FTIR results of graft copolymers of ECOFLEX™, (poly (butylene adipate-co-terephthalate)), obtained from BASF (Germany), with plasticized starch (PS). To validate the reactivity, FTIR scans of pure ECOFLEX™, PS and ECOFLEX™/PS blend (without the catalyst) are also shown.

The resulting pellets were dried in an oven overnight at 75° C. The pellets were totally extracted in Dichloro methane using a Soxhlet extraction unit. The extracted graft copolymer solution was cast to form transparent films. FTIR analysis (FIG. 3) of the films confirmed reactivity and the true existence of a graft copolymer.

Example 2

Ser. No. 10/993,186

The procedure of Example 1 was followed using PCL™ (Poly (epsilon-caprolactone), obtained from Dow Chemical (Midland, Mich.); Molecular weight of 70,000 g/mol) polyester instead of ECOFLEX™. The resulting pellets were also dried in an oven overnight at 75° C. The pellets were totally extracted in Dichloro methane using a Soxhlet extraction unit. The extracted graft copolymer solution was cast to form transparent films. FTIR analysis of the films confirmed reactivity and the true existence of a graft copolymer.

Example 3

Ser. No. 10/993,186

The synthesis of starch-polyester graft copolymers was carried out as follows: Chemically modified plasticized starch (CMPS), produced by reactive extrusion processing of regular corn-starch, obtained from Corn Products (Chicago, Ill.), using maleic acid modifier, and glycerol (20-wt %) plasticizer as explained in the co-pending patent application was oven dried overnight at 75° C. and ground to a fine powder and fed using an external feeder to the feed port of the extruder. This composition is described in Applicants, co-pending application which is incorporated herein by reference. ECOFLEX™ was also fed to the feed port of the extruder using CENTURY™ feeder (Traverse City, Mich.). The feeder rates were adjusted accordingly to obtain a ratio of 70:30 (ECOFLEX:CMPS). The temperature profile and the screw configuration used are similar to Example 1. The vent port was kept open to remove unreacted maleic acid and water. The extruded strand was cooled using a water bath and pelletized in line. The pellets were dried in an oven overnight at 75° C., to remove surface moisture. The pellets were totally extracted in Dichloro methane using a Soxhlet extraction unit. The extracted graft copolymer solution was cast to form transparent films. FTIR analysis of the films (FIG. 4) confirmed reactivity and the true existence of a graft copolymer.

Example 4

Ser. No. 10/993,186

The synthesis of starch-polyester graft copolymers was carried out as follows: Chemically modified plasticized starch (CMPS), produced by reactive extrusion processing of regular corn-starch, obtained from Corn Products, using maleic acid modifier, BENTONE 166™ (BENTONE 166™ is an alkylaryl ammonium hectorite clay, obtained from Elementis Specialties, with greatly improved dispersibility characteristics. It provides excellent mechanical strength, flame retardancy and highly improved gas barrier properties) and glycerol (20-wt %) plasticizer as explained in the co-pending patent application was oven dried overnight at 75° C. and ground to a fine powder and fed using an external feeder to the feed port of the extruder. ECOFLEX™ was also fed to the feed port of the extruder using the CENTURY™ feeder. The feeder rates were adjusted accordingly to obtain a ratio of 70:30 (ECOFLEX:CMPS). The temperature profile and the screw configuration used are similar to Example 1. The vent port was kept open to remove maleic acid and water. The extruded strand was cooled using a water bath and pelletized in line. The pellets were dried in an oven overnight at 75° C., to remove surface moisture.

Example 5

Ser. No. 10/993,186

The synthesis of starch-polyester graft copolymers was carried out as follows: Chemically Modified plasticized starch (CMPS), produced by reactive extrusion processing of regular corn-starch, obtained from Corn Products, using maleic acid modifier, BENTONE 111™ (BENTONE 111™ is an organic derivative of a special smectite clay, obtained from Elementis Specialties. It provides excellent mechanical strength, flame retardancy and highly improved gas barrier properties) and glycerol (20-wt %) plasticizer as explained in the co-pending patent application was oven dried overnight at 75° C. and ground to a fine powder and fed using an external feeder to the feed port of the extruder. ECOFLEX™ was also fed to the feed port of the extruder using CENTURY™ feeder. The feeder rates were adjusted accordingly to obtain a ratio of 70:30 (ECOFLEX:CMPS). The temperature profile and the screw configuration used are similar to Example 1. The vent port was kept open to remove maleic acid and water. The extruded strand was cooled using a water bath and pelletized in line. The pellets were dried in an oven overnight at 75° C., to remove surface moisture.

Example 6

Ser. No. 10/993,186

The procedure given in Example 3 was followed using polycaprolactone (PCL) polyester instead of ECOFLEX™. The resulting pellets were also dried in an oven overnight at 75° C. The pellets were totally extracted in dichloromethane using a Soxhlet extraction unit. The extracted graft copolymer solution was cast to form transparent films. FTIR analysis of the films confirmed reactivity and the true existence of a graft copolymer.

Example 7

Ser. No. 10/993,186

ECOFLEX™ and cross-linked ECOFLEX™ (Cross-linked using a free radical initiator) were melt extruded with PS and CMPS in different proportions according to the procedure as explained in Example 3. All the samples were extracted in dichloromethane using a Soxhlet apparatus. The results of the extraction are shown in Table 2.

TABLE 2

Soxhlet Extraction results of ECOFLEX-CMPS graft copolymers

| System | Polyester (Ecoflex or LEcoflex) initially present (gm) | Starch component (PS or CMPS) initially present (gm) | Material extracted (gm) | % Extracted |
|---|---|---|---|---|
| Ecoflex/CMPS (70/30; w/w) | 1.3510 | 0.579 | 1.8878 | 98 |
| Ecoflex/CMPS (60/40; w/w) | 1.0682 | 0.7122 | 1.7010 | 96 |
| Ecoflex/CMPS (50/50; w/w) | 0.7998 | 0.7998 | 0.7503 | 47 |
| Ecoflex/CMPS (40/60; w/w) | 0.8639 | 0.5759 | 0.5513 | 38.2 |
| Ecoflex/CMPS (70/30; w/w) No Initiator used in the preparation of CMPS. | 1.9018 | 0.8150 | 2.6530 | 98 |
| Ecoflex/PS (70/30; w/w) | 1.2075 | 0.5175 | 1.2595 | 71 |
| LEcoflex/CMPS (65/35; w/w) | 3.25 | 1.748 | 4.1272 | 83 |
| LEcoflex/PS (70/30; w/w) | 1.0225 | 0.4382 | 1.0602 | 73 |

As seen from Table 2, almost complete extraction is achieved for ECOFLEX™/CMPS (70/30 w/w and 60/40 w/w) graft copolymers. When this solution was cast, a transparent film was obtained. This proves that ECOFLEX™ and CMPS are covalently linked making the graft copolymer extractable in Dichloromethane (solvent wherein ECOFLEX™ is soluble, but PS is not). However, due to the insolubility of PS in the solvent, the graft copolymer forms a colloidal dispersion and not a clear transparent solution.

This result is applicable even to blends containing CMPS made with no peroxide (see row 6 in Table 2). However, for the 50/50 and 40/60 blends, only 47% and 38% respectively (close to the respective ECOFLEX™ amount) were extracted out. This confirms the fact that ECOFLEX™ has not reacted with CMPS. Thus, the reaction is also dependent on the relative amounts of the polyester and CMPS phases present. Also, from Table 2 (rows 7 and 9), it is clearly seen that when PS is used instead of CMPS, there is very minimal or no reaction taking place. This suggests that the reaction between the hydroxyl groups in starch and the ester functionalities in ECOFLEX™ occurs only in the presence of a trans-esterification catalyst such as maleic acid. When ECOFLEX™ polyester was cross-linked and reactively blended with CMPS, around 83% of the polyester was extracted out. This could be due to the fact that certain gel (network) portions of the cross-linked polyester are impermeable to chemical reaction.

Example 8

Ser. No. 10/993,186

Several graft copolymer samples, prepared using both PS and CMPS according to procedures explained in Examples 1, 3, 4 and 5 were extruded into films. Films were made using a Killion™ (Pawcatuck, Conn.) single-screw blown film unit. The screw diameter was 25.4 mm with L:D ratio of 25:1. The die inner diameter was 50.8 mm with a die gap size of 1.5 mm. The blown film processing conditions are shown in Table 3.

TABLE 3

Blown Film Processing Conditions for ECOFLEX-(PS/CMPS) graft copolymers

| | | | | | | | | |
|---|---|---|---|---|---|---|---|---|
| Set (° F.) | 70 | 350 | 355 | 360 | 360 | 395 | 395 | 300 |
| Actual (° F.) | 73 | 351 | 358 | 357 | 360 | 380 | 395 | 300 |

| | |
|---|---|
| Melt (° F.) | 364 |
| Screw Speed (RPM) | 12.4 |
| FPM (ft/min) | 5-6 |
| Pressure (psi) | 500-1000 |

Figure 4:
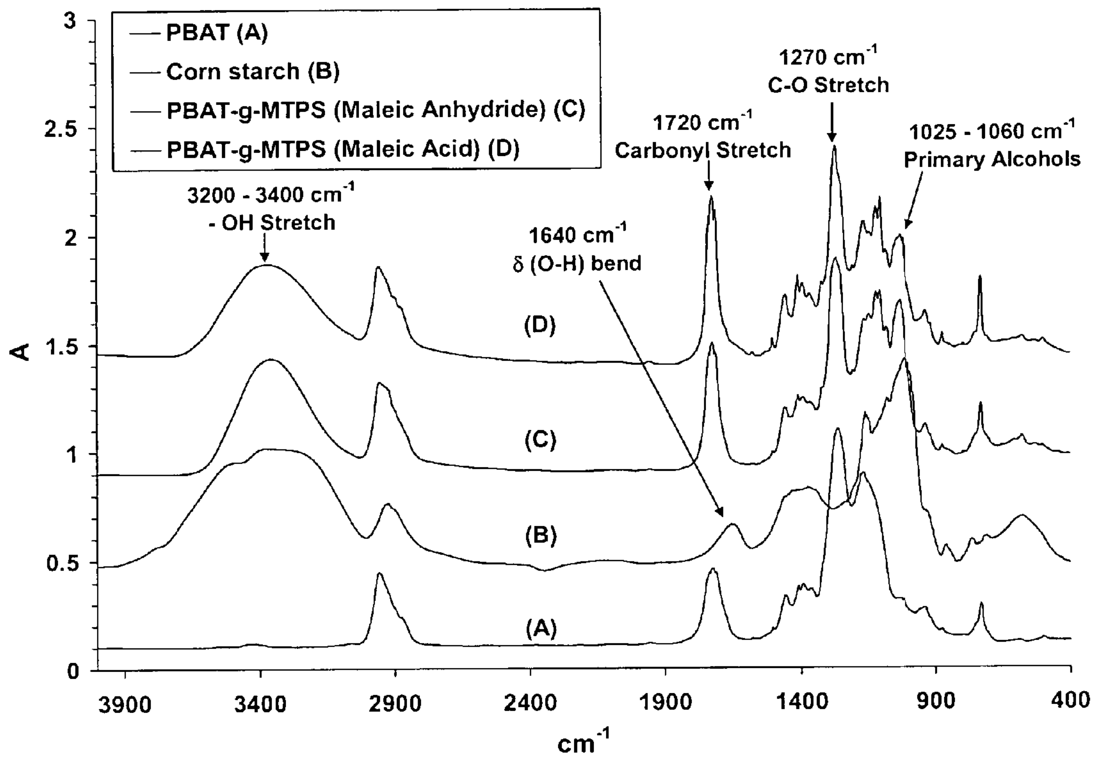
FIG. 4 is a graph showing the FTIR results of graft copolymers of ECOFLEX™ with chemically modified plasticized starch CMPS (made using both maleic anhydride and maleic acid modifiers). To validate the reactivity, FTIR scans of pure ECOFLEX™ and regular cornstarch are also shown.
Figure 5:
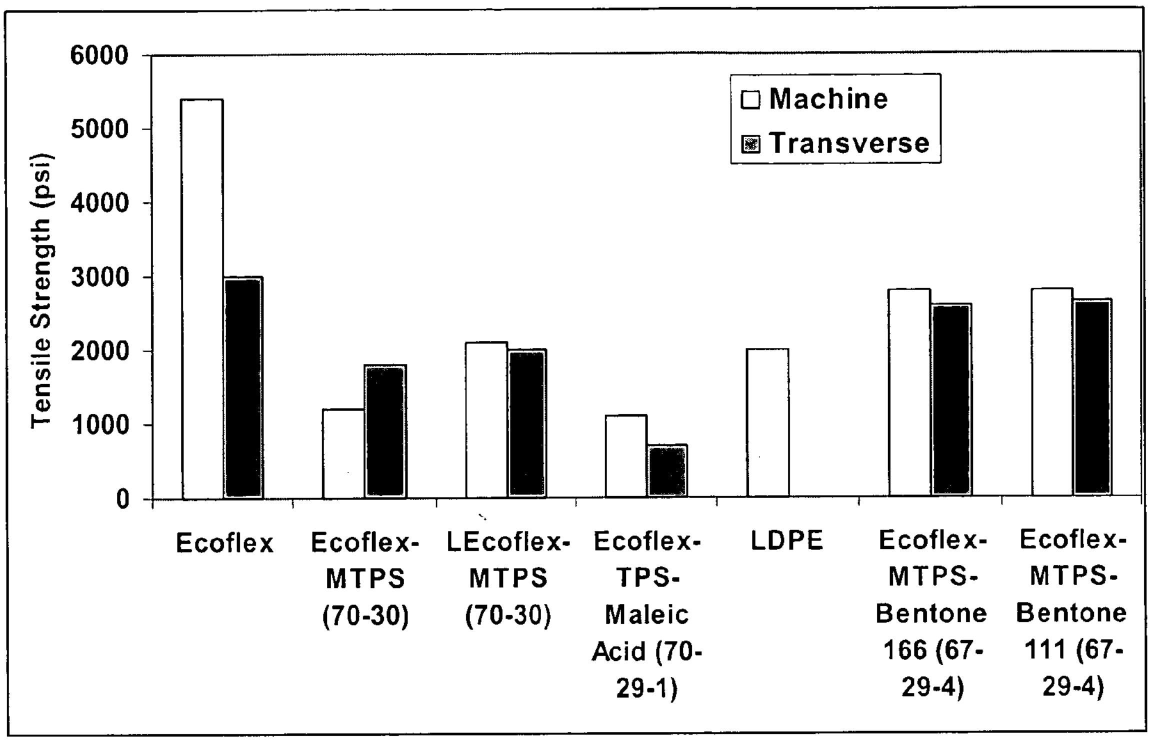
FIG. 5 shows bar graphs depicting tensile strength values of ECOFLEX™, graft copolymer of ECOFLEX™ with CMPS, graft copolymer of cross-linked ECOFLEX™ with CMPS, graft copolymer of ECOFLEX™ with PS and LDPE.
Figure 6:
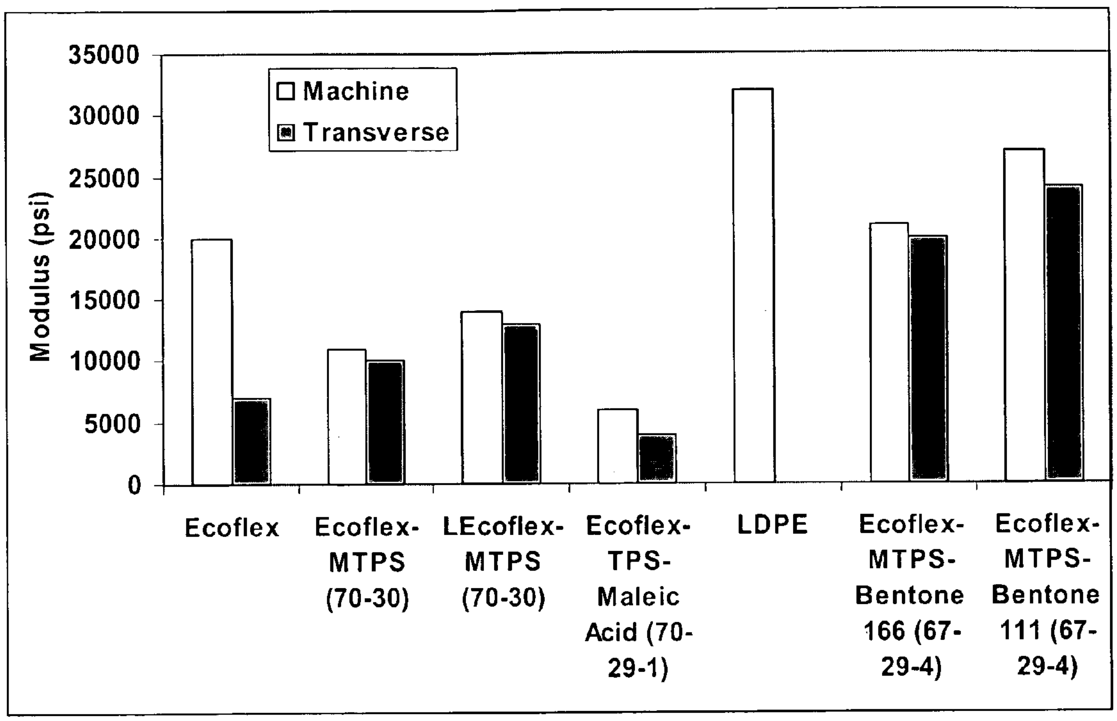
FIG. 6 shows bar graphs depicting modulus of elasticity values of ECOFLEX™, graft copolymer of ECOFLEX™ with CMPS, graft copolymer of cross-linked ECOFLEX™ with CMPS, graft copolymer of ECOFLEX™ with PS and LDPE.
Figure 7:
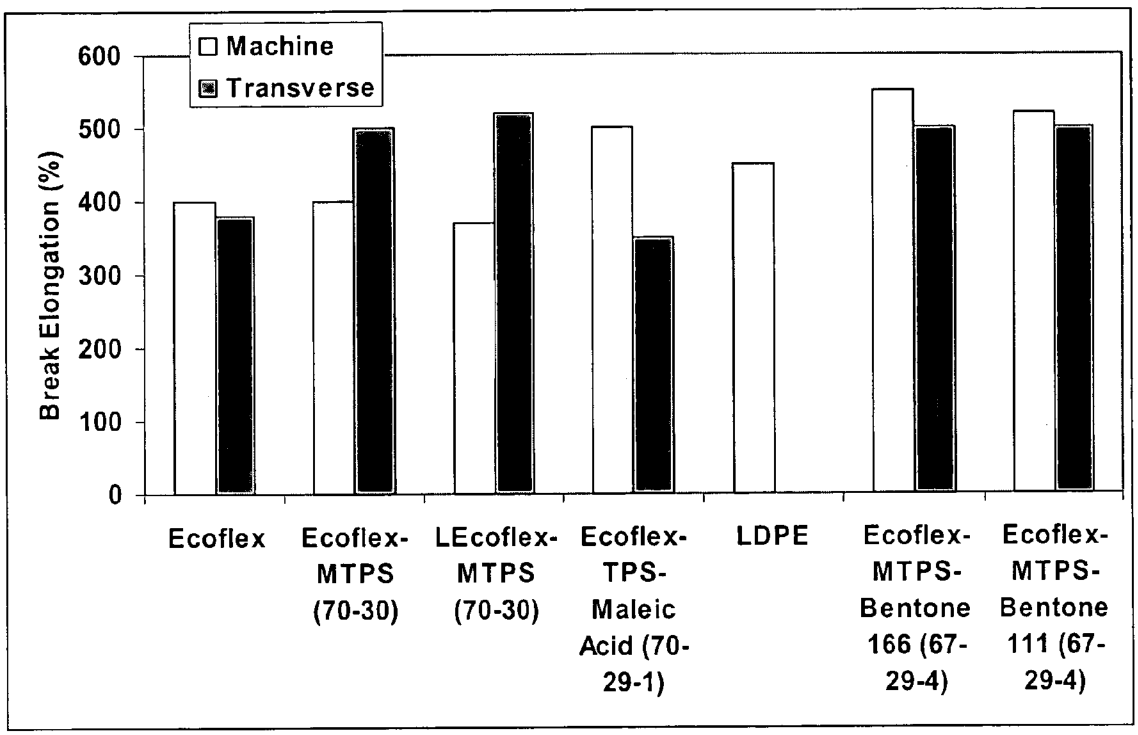
FIG. 7 shows bar graphs depicting break elongation values of ECOFLEX™, graft copolymer of ECOFLEX™ with CMPS, graft copolymer of cross-linked ECOFLEX™ with CMPS, graft copolymer of ECOFLEX™ with PS and LDPE.
Figure 8:
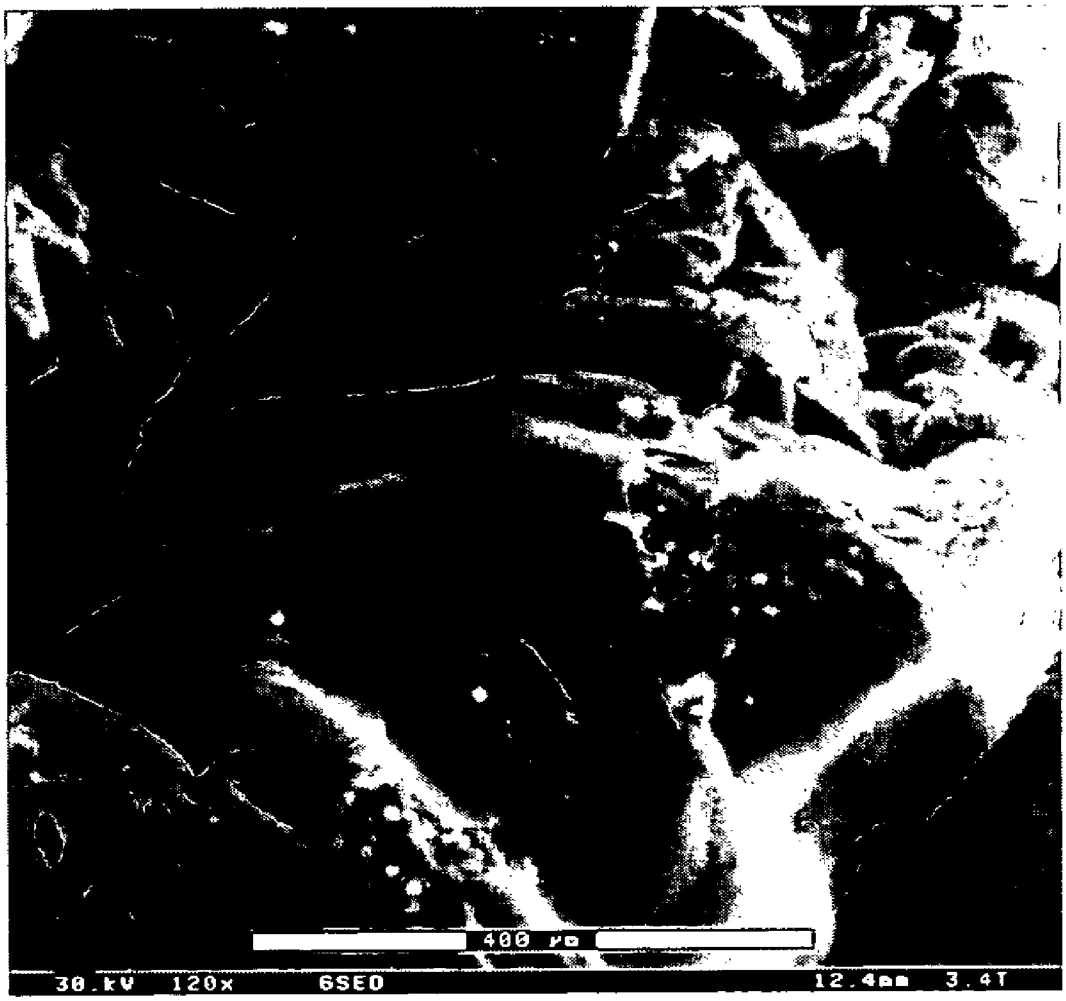
FIG. 8 shows the electron micrograph of the surface of the starch foams in the absence of the polyester and compatibilizer.
Figure 9:
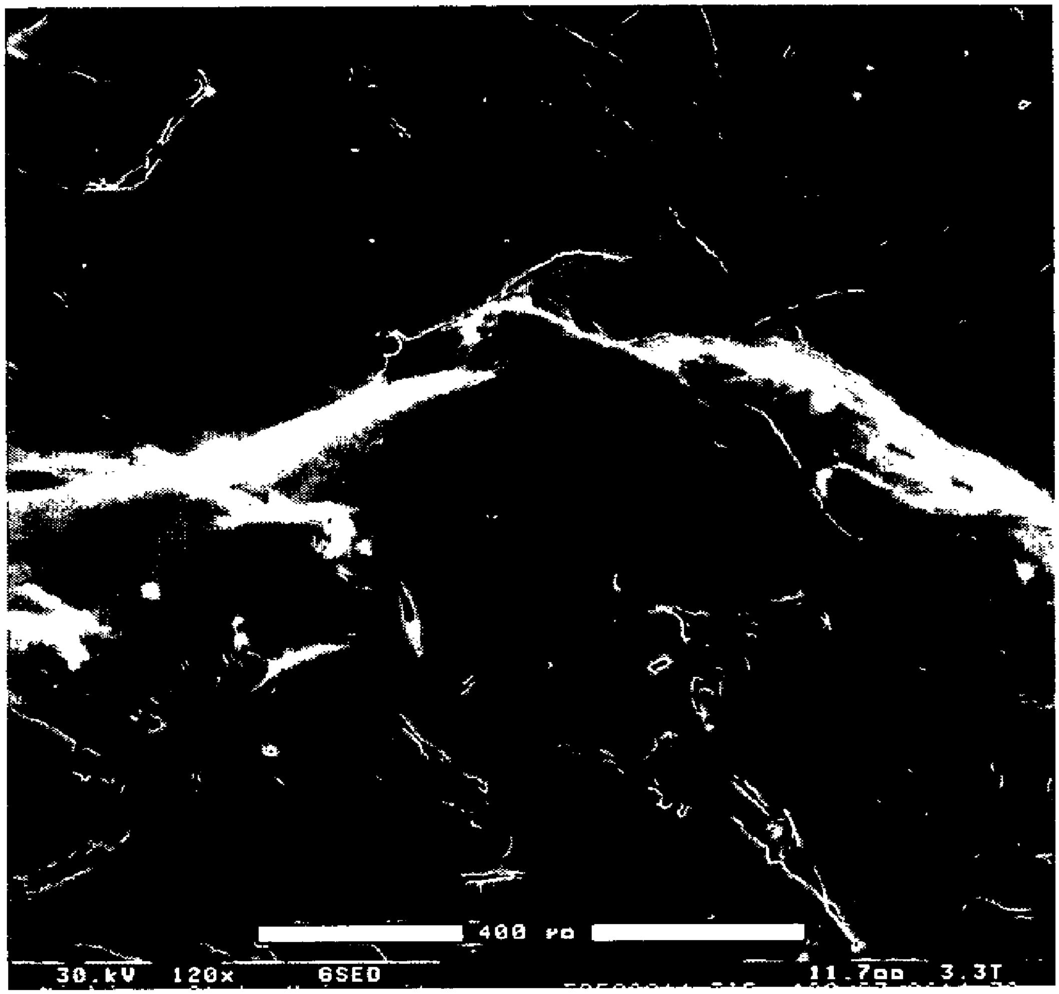
FIG. 9 shows the electron micrograph of the surface of the starch foams in the presence of the polyester and absence of the compatibilizer. The phase separation between the polyester and the starch plastic is evident from the micrograph.
Figure 10:
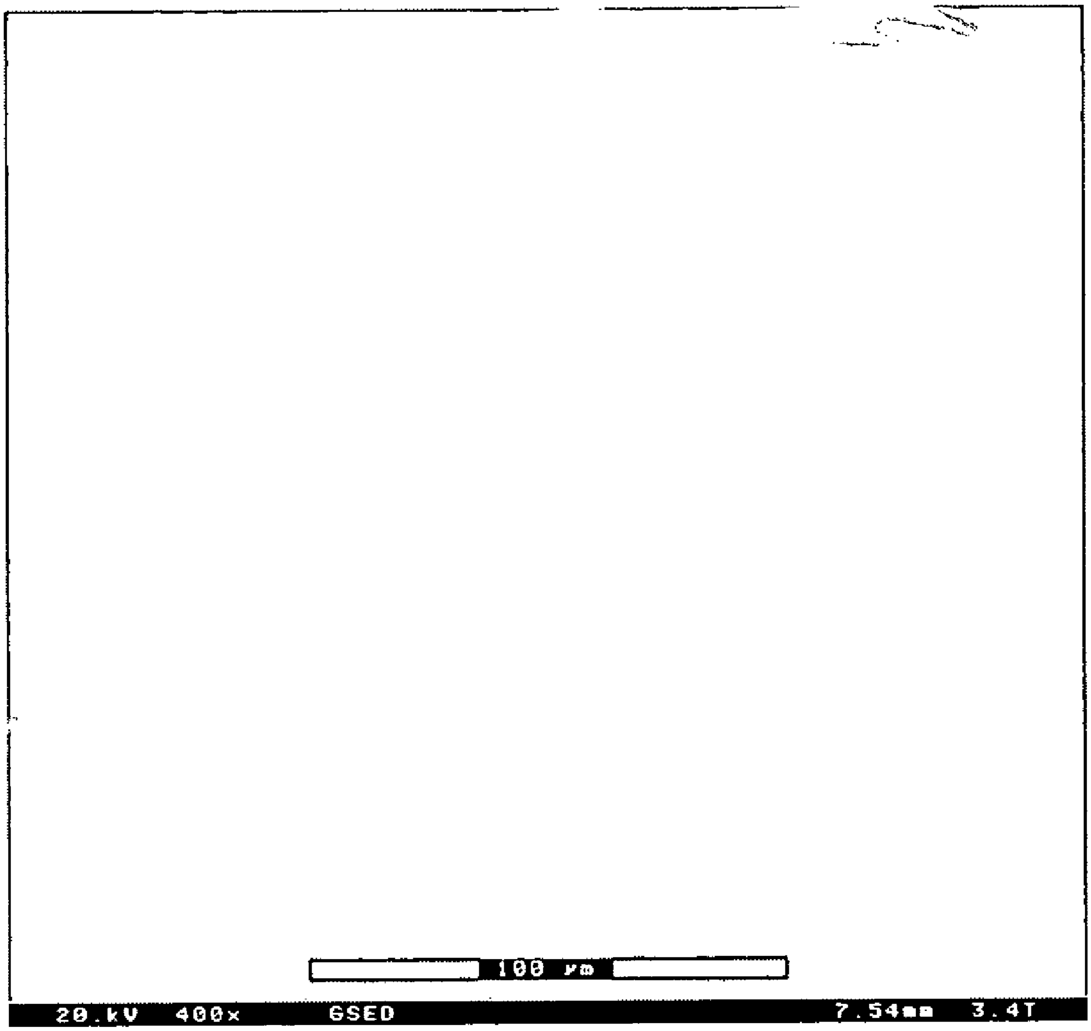
FIG. 10 shows the electron micrograph of the surface of the starch foams in the presence of the polyester and the compatibilizer. The compatibility between the starch and the polyester has been improved using the amphiphilic starch-polyester graft copolymer.

Tensile properties of the films were determined using INSTRON™ Mechanical Testing Equipment fitted with a 100 lbs load cell. The crosshead speed was 1 inch per minute. Rectangular film samples, 4'×1' dimension were conditioned at 23° C. and 50% Relative Humidity for 40 hours before being tested according to ASTM D-882 testing. The results of the testing are shown in FIGS. 4, 5 and 6. It is observed that the tensile strength and modulus of elasticity values of ECOFLEX™-PS graft copolymer, containing around 30% PS, exhibit almost a six fold decrease as compared to pure ECOFLEX™ polyester values. However, ECOFLEX™/CMPS graft copolymers and cross-linked ECOFLEX™ (ECOFLEX)/CMPS graft copolymers exhibit tensile values comparable to LDPE. Also, on incorporation of clay in the production of ECOFLEX™/CMPS, the film tensile strength further improves to about 2800-3000 psi (twice as much as ECOFLEX™/CMPS). Break elongation values of the graft copolymer are higher than ECOFLEX™ and LDPE. Tear and Puncture properties, determined according to ASTM D1922 and ASTM F1306 respectively, were found to be comparable to LDPE.

TABLE 4

Tear and Puncture properties of ECOFLEX-CMPS (70/30) graft copolymer

| Material | Thickness (in) | Tear (g) MD ASTM D 1922 | Tear (g) CMD ASTM D 1922 | Puncture Max. ($lb_f$) ASTM F 1306 | Puncture Ext. (in) ASTM F 1306 |
|---|---|---|---|---|---|
| LDPE | 0.0010-0.0015 | 100-300 | — | 1.5-3.0 | — |
| Ecoflex-MTPS(70/30) graft copolymer | 0.0010-0.0015 | 767.7 | 802.7 | 1.515 | 0.6219 |

The above examples demonstrate that the new starch-based graft copolymers which utilize agricultural resources that can be returned back to nature in an environmentally sound manner. The polymeric materials made in accordance with the present invention are environmentally compatible, this being achieved by designing and engineering fully biodegradable materials that are thermoplastic, yet breakdown under appropriate environmental conditions in a manner similar to their lignocellulosic counterparts.

The following experimental Examples 9 to 14 demonstrate the utility of the present invention for forming biodegradable products containing a biodegradable starch or plasticized starch and biodegradable polyester in the presence of a trans-esterification catalyst. The product thus obtained improves the physico-mechanical properties of the starch-polyester foams significantly by acting as a compatibilizer. Examples of materials made in accordance with the present invention in compost experiments confirm biodegradability.

Example 9

The synthesis of ECOFLEX-TPS graft copolymers was accomplished in a twin-screw co-rotating CENTURY extruder using maleic acid as a trans-esterification catalyst. TPS was produced by plasticization of regular corn-starch, obtained from Corn Products, Inc. (moisture content of 12%) using glycerol (20-wt %) as a plasticizer in the same extruder. Maleic acid, obtained from Aldrich, was ground to a fine powder using a mortar and pestle and pre-blended with the ECOFLEX FBX 7011 polyester (poly butylenes(adipate-co-terephthalate, obtained from BASF) before being fed to the feed port of the extruder. The concentration of maleic acid used was 3-wt % with respect to the total concentration. Meanwhile, TPS, previously oven dried overnight at 50° C., was ground to a fine powder and fed using an external feeder to the feed port of the extruder. The feeder rates were adjusted accordingly to obtain a ratio of 70:30 (ECOFLEX+Maleic acid):TPS. The temperature profile and the screw configuration used are shown in Table 1 and FIG. 1, respectively. In FIG. 1, the entire screw configuration is divided into 3 sections; section 1 of 12.5 D distance followed by section 2 of 15.5 D distance and finally section 3 with 12 D distance. The vent port was kept open to remove unreacted maleic acid and water. The extruded strand was cooled using a water bath and pelletized in line. The resulting pellets were dried in an oven overnight at 75° C. The pellets were totally extracted in dichloromethane using a Soxhlet extraction unit. The Soxhlet extraction results are tabulated in Table 3. The extracted graft copolymer solution was cast to form transparent films. FTIR analysis of the films confirmed reactivity and the true existence of a graft copolymer (Refer FIG. 2).

4.5 by weight of ECOFLEX FBX 7011, 0.5% by weight of the starch-polyester graft copolymer produced above, 1% by weight of talc (magnesium silicate) and 95% by weight of hydroxypropylated high amylase cornstarch (70% amylose, 30% amylopectin) having a moisture content of 11.2% (d.b.) were premixed and then fed to a Century ZSK-30 co-rotating twin screw extruder. Water was used as the plasticizer as well as the blowing agent. Initially, during start-up, water was pumped into the system immediately after the feed throat, at 15-20% of the starch fed, and later its flow rate was reduced to about 7-10% of starch. The screws had a diameter of 30 mm and a length to diameter ratio of 42:1. The temperature profile is shown in Table 5.

TABLE 5

Extrusion Processing Conditions in the production of starch foams using polyester and starch-polyester graft copolymer as a compatibilizer.

| ZONE | SET | ACTUAL | UNITS |
|---|---|---|---|
| ZONE1 | 15 | 58 | ° C. |
| ZONE2 | 80 | 36 | ° C. |
| ZONE3 | 115 | 117 | ° C. |
| ZONE4 | 125 | 131 | ° C. |
| ZONE5 | 130 | 134 | ° C. |
| ZONE6 | 135 | 137 | ° C. |
| ZONE7 | 135 | 142 | ° C. |
| ZONE8 | 135 | 144 | ° C. |
| ZONE9 | 130 | 139 | ° C. |
| DIE | 120 | 126 | ° C. |
| MELT TEMP. | | 129 | ° C. |
| MOTOR SPEED | | 398 | RPM |
| TORQUE | | 74 | % |
| PRESSURE | | 650-690 | Psi |
| FEEDER SPEED, CENTURY (Starch + talc) | | 8 | Lb/hr |
| WATER PUMP | | 0.74 | Lb/hr |
| FEEDER SPEED, EXT (ECOFLEX + Starch-Polyester Graft copolymer) | | 0.4 | Lb/hr |

The die section that was connected to the barrel had a nozzle opening of 2.7 mm in diameter. Barrel and die temperatures were maintained by electrical heaters. The screws rotated at 200 rpm. The expanded cylindrical extrudate having a unit density of 19.42 kg/m$^3$ and an expansion ratio of 51.93 was obtained. The physico-mechanical properties such as density, expansion ratio, specific length, and resiliency of the foams (important in cushion packaging applications) are tabulated in Table 6B.

Example 10

Maleated thermoplastic starch (MTPS) was produced by reactive extrusion processing of regular corn-starch, obtained from Corn Products, using maleic anhydride (3% by weight) modifier and glycerol (20-wt %) plasticizer as explained in the co-pending patent application Ser. No. 10/993,186. The processing conditions are shown in Table 1, and the screw configuration is shown in FIG. 1. MTPS was oven dried overnight at 75° C. and ground to a fine powder.

MTPS and PCL TONE 787 were used to form the starch-polyester graft copolymer. MTPS was fed using an external feeder to the feed port of the extruder. PCL TONE 787 having a molecular weight (Mw) of 80,000, from Dow Chemical was also fed to the feed port of the extruder using CENTURY feeder. The feeder rates were adjusted accordingly to obtain a ratio of 75:25 (PCL:MTPS). The temperature profile used is shown in Table 1. The vent port was kept open to remove maleic acid and water. The extruded strand was cooled using a water bath and palletized in line.

2% by weight of PCL TONE 787, 1% by weight of the starch-polyester graft copolymer produced above, 0.5% by weight of talc (magnesium silicate) and 7% by weight of hydroxypropylated high amylase cornstarch (70% amylase, 30% amylopectin) having a moisture content of 11.2% (d.b.) were premixed and then fed to a Century ZSK-30 co-rotating twin screw extruder. Water was used as the plasticizer as well as the blowing agent. Initially, during start-up, water was pumped into the system immediately after the feed throat, at 15-20% of the starch fed, and later its flow rate was reduced to about 7-10% of starch. The screws had a diameter of 30 mm and a length to diameter ratio of 42:1. The temperature profile is shown in Table 5. The die section that was connected to the barrel had a nozzle opening of 2.7 mm in diameter. Barrel and die temperatures were maintained by electrical heaters. The screws rotated at 200 rpm. The expanded cylindrical extrudate having a unit density of 24.57 kg/m$^3$ and an expansion ratio of 44.99 was obtained.

Example 11

Maleated thermoplastic starch (MTPS) was produced by reactive extrusion processing of high amylase corn starch, obtained from National Starch and Chemicals, using maleic anhydride (5% by weight) modifier and glycerol (20-wt %) plasticizer as explained in the co-pending patent application Ser. No. 10/993,186. The processing conditions are shown in Table 1, and the screw configuration is shown in FIG. 1. MTPS was oven dried overnight at 75° C. and ground to a fine powder. MTPS and ECOFLEX FBX 7011 were used to form the starch-polyester graft copolymer. MTPS was fed using an external feeder to the feed port of the extruder. ECOFLEX FBX 7011 having a molecular weight of 51,000, from BASF Chemicals was also fed to the feed port of the extruder using CENTURY feeder. The feeder rates were adjusted accordingly to obtain a ratio of 80:30 (ECOFLEX:MTPS). The temperature profile is shown in Table 1. The vent port was kept open to remove maleic acid and water. The extruded strand was cooled using a water bath and pelletized in line.

4.5% by weight of ECOFLEX FBX 7011, 0.5% by weight of the starch-polyester graft copolymer produced above, 0.5% by weight of talc (magnesium silicate) and 95% by weight of Hydroxypropylated high amylase cornstarch (70% amylase, 30% amylopectin) having a moisture content of 11.2% (d.b.) were premixed and then fed to a Century ZSK-30 co-rotating twin screw extruder. Water was used as the plasticizer as well as the blowing agent. Initially, during start-up, water was pumped into the system immediately after the feed throat, at 15-20% of the starch fed and later its flow rate was reduced to about 7-10% of starch. The screws had a diameter of 30 mm and a length to diameter ratio of 42:1. The temperature profile is shown in Table 5. The die section that was connected to the barrel had a nozzle opening of 2.7 mm in diameter. Barrel and die temperatures were maintained by electrical heaters.

The screws rotated at 250 rpm. The expanded cylindrical extrudate having a unit density of 19.01 kg/m$^3$ and an expansion ratio of 47.03 was obtained.

Example 12

The synthesis of PCL-TPS graft copolymers was accomplished in a twin-screw co-rotating CENTURY extruder using maleic anhydride as a trans-esterification catalyst. TPS was produced by plasticization of waxy corn-starch, obtained from Corn Products, Inc. (moisture content of 12%) using glycerol (20-wt %) as a plasticizer in the same extruder. Maleic anhydride, obtained from Aldrich, was ground to a fine powder using a mortar and pestle and pre-blended with the PCL TONE 787 polyester (obtained from The Dow Chemical Co., Midland, Mich.) before being fed to the feed port of the extruder. The concentration of maleic acid used was 5-wt % with respect to the total concentration. Meanwhile, TPS, previously oven dried overnight at 50° C., was ground to a fine powder and fed using an external feeder to the feed port of the extruder. The feeder rates were adjusted accordingly to obtain a ratio of 80:20 [PCL+Maleic anhydride):TPS]. The temperature profile and the screw configuration used are shown in Table 1 and FIG. 1, respectively. The vet port was kept open to remove unreacted maleic anhydride and water. The extruded strand was cooled using a water bath and pelletized in line.

3% by weight of the starch-polyester graft copolymer produced above, 1% by weight of talc (magnesium silicate) and 97% by weight of Hydroxypropylated high amylase cornstarch (70% amylase, 30% amylopectin) having a moisture content of 11.2% (d.b.) were premixed and then fed to a Century ZSK-30 co-rotating twin screw extruder. Water was used as the plasticizer as well as the blowing agent. Initially, during start-up, water was pumped into the system immediately after the feed throat, at 15-20% of the starch fed, and later its flow rate was reduced to about 7-10% of starch. The screws had a diameter of 30 mm and a length to diameter ratio of 42:1. The temperature profile is shown in Table 5. The die section that was connected to the barrel had a nozzle opening of 2.7 mm in diameter. Barrel and die temperatures were maintained by electrical heaters. The screws rotated at 250 rpm. The expanded cylindrical extrudate having a unit density of 25.23 kg/m$^3$ and an expansion ratio of 45.63 was obtained.

Example 13

Maleated thermoplastic starch (MTPS) was produced by reactive extrusion processing of regular corn-starch, obtained from Corn Products, using maleic anhydride (3% by weight) modifier and glycerol (20-wt %) plasticizer as explained in the co-pending patent application Ser. No. 10/993,186 and Ser. No. 10/993,309, filed Nov. 19, 2004, which is incorporated herein by reference. The processing conditions are shown in Table 1, and the screw configuration is shown in FIG. 1. MTPS was oven dried overnight at 75° C. and ground to a fine powder.

MTPS and ECOFLEX FBX 7011 were used to form the starch-polyester graft copolymer. MTPS was fed using an external feeder to the feed port of the extruder. ECOFLEX FBX 7011 having a molecular weight of 51,000 from BASF Chemicals was also fed to the feed port of the extruder using CENTURY feeder. The feeder rates were adjusted accordingly to obtain a ratio of 50:50 (ECOFLEX:MTPS). The temperature profile used is shown in Table 5. The vent port was kept open to remove maleic acid and water. The extruded strand was cooled using a water bath and palletized in line.

4% by weight of ECOFLEX FBX 7011, 1% by weight of the starch-polyester graft copolymer produced above, 0.5% by weight of talc (magnesium silicate) and 95% by weight of regular cornstarch (28% amylase, 72% amylopectin) having a moisture contentlof 12% (d.b.) were premixed and then fed to a Century ZSK-30 co-rotating twin screw extruder. The screws had a diameter of 30 mm and a length to diameter ratio of 42:1. Water was used as the plasticizer as well as the blowing agent. Initially, during start-up, water was pumped into the system immediately after the feed throat, at 15-20% of the starch fed, and later its flow rate was reduced to about 7-10% of starch. The temperature profile is shown in Table 5. The die section that was connected to the barrel had a nozzle opening of 2.7 mm in diameter. Barrel and die temperatures were maintained by electrical heaters. The screws rotated at 225 rpm. The expanded cylindrical extrudate having a unit density of 32.88 kg/$m^3$ and an expansion ratio of 30.6 was obtained.

Example 14

Maleated thermoplastic starch (MTPS) was produced by reactive extrusion processing of regular corn-starch, obtained from Corn Products, using maleic anhydride (3% by weight) modifier and glycerol (20-wt %) plasticizer as explained in the co-pending patent application Ser. No. 10/933,309. The processing conditions are shown in Table 1, and the screw configuration is shown in FIG. 1. MTPS was oven dried overnight at 75° C. and ground to a fine powder.

MTPS and ECOFLEX FBX 7011 were used to form the starch-polyester graft copolymer. MTPS was fed using an external feeder to the feed port of the extruder. ECOFLEX FBX 7011 having a molecular weight of 51,000, from BASF Chemicals was also fed to the feed port of the extruder using CENTURY feeder. The feeder rates were adjusted accordingly to obtain a ratio of 60:40 (ECOFLEX:MTPS). The temperature profile used is shown in Table 1. The vent port was kept open to remove maleic acid and water. The extruded strand was cooled using a water bath and pelletized in line.

4% by weight of ECOFLEX FBX 7011, 1% by weight of the starch-polyester graft copolymer produced above, 0.5% by weight of talc (magnesium silicate) and 95% by weight of waxy cornstarch (>99% amylopectin) having a moisture content of 12% (d.b.) were premixed and then fed to a Century ZSK-30 co-rotating twin screw extruder. Water was used as the plasticizer as well as the blowing agent. Initially, during start-up, water was pumped into the system immediately after the feed throat, at 15-20% of the starch fed, and later its flow rate was reduced to about 7-10% of starch. The screws had a diameter of 30 mm and a length to diameter ratio of 42:1. The temperature profile is shown in Table 5. The die section that was connected to the barrel had a nozzle opening of 2.7 mm in diameter. Barrel and die temperatures were maintained by electrical heaters. The screws rotated at 250 rpm. The expanded cylindrical extrudate having a unit density of 30.31 kg/$m^3$ and an expansion ratio of 36.59 was obtained.

The above examples demonstrate that the present invention provides new starch-based graft copolymer foams which utilize agricultural resources that can be returned back to nature in an environmentally sound manner. The polymeric foam materials made in accordance with the present invention are environmentally compatible, this being achieved by designing and engineering fully biodegradable materials that are thermoplastic, yet breakdown under appropriate environmental conditions in a manner similar to their lignocellulosic counterparts.

The biodegradable starch polyester graft co-polymer has been used as a compatibilizer between the hydrophilic starch phase and the hydrophobic polyester phase to give improved physico-mechanical properties of starch foams using polyester as a processing aid. Table 6A shows the properties of the starch foams obtained without using the starch-polyester graft co-polymer. Table 6B shows the properties of the starch foams of Examples 9 to 14 using the starch polyester graft co-polymer as a processing aid, as well as a compatibilizer. The improvement in properties is marginal when the starch polyester graft co-polymer is used as a processing aid, but it is substantial when the co-polymer is used as a compatibilizer between the starch and the polyester.

TABLE 6A

Physico-Mechanical Properties of Prior Art Starch-based Foams.

| Entry | Formulation | Density (kg/$m^3$) | Expansion Ratio | Specific Length (cm/gm) | Resiliency (%) |
|---|---|---|---|---|---|
| 1 | Hydroxypropylated high amylase corn Starch (control) | 30.19 | 39.60 | 14.61 | 69.76 |
| 2 | High Amylose corn starch (control) | 35.69 | 35.57 | 13.76 | 60.45 |
| 3 | Regular corn starch (control) | 45.82 | 23.26 | 16.39 | 21.88 |
| 4 | Waxy corn starch (control) | 42.42 | 28.55 | 14.42 | 31.45 |
| 5 | Hydroxypropylated high amylase corn starch + 5% (w/w) ECOFLEX FBX 7011 | 24.17 | 46.72 | 15.47 | 84.26 |
| 6 | Regular corn starch + 5% (w/w) ECOFLEX FBX 7011 | 40.94 | 24.52 | 17.40 | 62.47 |
| 7 | Waxy corn starch + 5% (w/w) ECOFLEX FBX 7011 | 36.35 | 31.97 | 15.03 | 67.51 |
| 8 | Hydroxypropylated high amylase corn starch + 3% (w/w) PCL TONE 787 | 26.23 | 42.68 | 15.60 | 78.17 |

TABLE 6B

Physico-Mechanical properties of Starch-based foams.

| Entry | Formulation | Density (kg/$m^3$) | Expansion Ratio | Specific Length (cm/gm) | Resiliency (%) |
|---|---|---|---|---|---|
| 1 | Foam from Example 9 (Compare with Entries 1 & 5 of Table 6A) | 19.42 | 51.93 | 17.32 | 91.78 |
| 2 | Foam from Examples 10 (Compare with Entries 1 & 8 of Table 6A) | 24.58 | 44.99 | 15.88 | 87.48 |
| 3 | Foam from Example 11 (Compare with Entries 1 & 5 of Table 6A) | 19.01 | 47.03 | 19.54 | 91.59 |
| 4 | Foam from Example 12 (Compare with Entries 1 & 8 of Table 6A | 25.23 | 45.63 | 15.26 | 82.29 |

TABLE 6B-continued

| Physico-Mechanical properties of Starch-based foams. | | | | | |
|---|---|---|---|---|---|
| Entry | Formulation | Density (kg/m$^3$) | Expansion Ratio | Specific Length (cm/gm) | Resiliency (%) |
| 5 | Foam from Example 13 (Compare with Entries 3 & 6 of Table 6A) | 32.88 | 30.60 | 17.36 | 70.95 |
| 6 | Foam from Example 14 (Compare with Entries 4 & 7 of Table 6A) | 30.31 | 36.59 | 15.75 | 78.02 |

For example, the foams obtained from Examples 9 and 11 (entries 1 and 3 of Table 6B) below have 35-37% lower densities and 31-32% higher resilience as compared to the hydroxypropylated high amylase corn starch foam (entry 1 of Table 6A), and 19-22% lower densities and 8-10% higher resilience as compared to hydroxypropylated high amylase starch foam with 5% ECOFLEX FBX 7011 (entry 5 of Table 6A).

The foam obtained from Example 10 of Table 6B has 18-20% lower density and about 25% higher resilience as compared to the hydroxypropylated high amylase corn starch foam (entry 1 of Table 6A), and 6-8% lower density and 12-14% higher resilience as compared to hydroxypropylated high amylose starch foam with 3% CL TONE 787 (entry 8 of Table 6A).

The foam obtained from Example 13 of Table 6B has 28-30% lower density and about 200-225% higher resilience as compared to the regular corn starch foam (entry 3 of Table 6A), and 18-20% lower density and 12-15% higher resilience as compared to regular corn starch foam with 5% ECOFLEX FBX 7011 (entry 6 of Table 6A).

The foam obtained from Example 14 of Table 6B has 25-30% lower density and about 145-150% higher resilience as compared to the waxy corn starch foam (entry 4 of Table 6A), and 15-18% lower density and 15-18% higher resilience as compared to waxy corn starch foam with 5% ECOFLEX FBX 7011 (entry 7 of Table 6A).

The extruded foam of the present invention is particularly useful for packing materials, sheets and other shapes. The foams can be combined and bonded together to form useful shapes. The foams are preferably biodegradable.

It is intended that the foregoing description be only illustrative of the present invention and that the present invention be limited only by the hereinafter appended claims.

We claim:

1. A thermoplastic polymer foam composition which comprises an extruded mixture of:

(a) a starch-polyester graft copolymer composition comprising a starch with segments of a polyester grafted onto the starch; and (b) a thermoplastic polymer other than the starch-polyester graft copolymer, wherein the mixture has been extruded in the presence of a blowing agent, thereby forming the thermoplastic polymer foam composition; and, the polyester comprises an aliphatic-aromatic copolyester of the form:

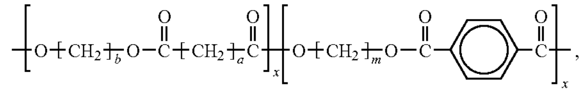

where a, b and m are 2 to 8; and x/y is between 3/2 and 10/1.

2. The foam composition of claim 1 wherein the starch comprises a thermoplastic modified starch selected from the group consisting of esterified starches, etherified starches, oxidized starches, acid-hydrolyzed starches, and crosslinked starches.

3. The foam composition of claim 1 or 2 wherein the starch is selected from the group consisting of corn, potato, wheat, rice, sago, tapioca, waxy maize, sorghum and high amylose starch.

4. The foam composition of claim 1 or 2, wherein the starch-polyester graft copolymer comprises an extruded mixture of a chemically modified starch and the polyester, the chemically modified starch comprising an extruded mixture of 50 to 80 wt. % of the starch, 0.5 to about 10 wt. % of a starch modifier selected from the group consisting of dibasic acids and their anhydrides, 10 to 50 wt. % of a plasticizer, and optionally 0.01 to 2.0 wt. % of a free radical initiator.

5. The foam composition of claim 4, further comprising a nanoclay in an amount ranging from 0.5 to 25 wt % of the foam composition.

6. The foam composition as set forth in claim 1 or 2, wherein the starch-polyester graft copolymer comprises a polyhydric alcohol plasticizer.

7. The foam composition as set forth in claim 1 or 2, wherein the starch-polyester graft copolymer comprises an extruded mixture of (i) the starch, (ii) a starch modifier selected from the group consisting of dibasic acids, anhydrides thereof, and combinations thereof, and (iii) the polyester.

8. The foam composition of claim 1 or 2 further comprising a free radical initiator.

9. The foam composition of claim 1 or 2 further comprising a free radical initiator which is a peroxide.

10. The foam composition of claim 1 or 2 further comprising a nanoclay selected from the group consisting of montmorillonite, smectite, hectorite, and mixtures thereof.

11. The foam composition of claim 1 or 2 which is completely biodegradable.

12. The foam composition of claim 1 or 2, wherein the starch-polyester graft copolymer has been grafted in a melt phase in an extruder.

13. The foam composition of claim 1 or 2, wherein the starch-polyester graft copolymer has been grafted in a twin screw extruder at a temperature in the range of 100° C.-200° C. prior to foaming.

14. The foam composition of claim 1, wherein the starch-polyester graft copolymer comprises about 0.5 to 25% by weight of a plasticizer.

15. The foam composition of claim 1, further comprising a nanoclay.

16. The foam composition of claim 1, wherein the starch-polyester graft copolymer comprises 50 to 90 wt. % of the polyester.

17. A process for the preparation of a thermoplastic polymer foam composition, the process comprising:

(a) blending a mixture comprising an organic acid or an anhydride thereof, a starch, and a polyester at a temperature which grafts segments of the polyester onto the starch to form a starch-polyester graft copolymer composition, wherein the polyester comprises an aliphatic-aromatic copolyester of the form:

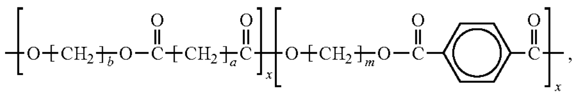

where a, b and m are 2 to 8; and x/y is between 3/2 and 10/1; and (b) thermoplastically extruding the starch-polyester graft copolymer composition with a blowing agent and a thermoplastic polymer other than the starch-polyester graft copolymer, during or after step (a), thereby forming the thermoplastic polymer foam composition.

18. The process of claim 17 wherein the blending is in an extruder at a temperature between about 100 to 200° C.

19. The process of claim 17 or 18 wherein the organic acid is a dibasic acid.

20. The process of claim 17 or 18 wherein the organic acid is a dibasic acid produced in situ in the blending by reaction of an anhydride with water contained in the starch.

21. The process of claim 17 or 18 wherein the mixture of step (a) further comprises a plasticizer.

22. The process of claim 17 or 18 wherein the mixture of step (a) further comprises a peroxide initiator.

23. The process of claim 17 wherein the mixture of step (a) further comprises a nanoclay.

* * * * *

UNITED STATES PATENT AND TRADEMARK OFFICE

CERTIFICATE OF CORRECTION

PATENT NO. : 7,638,560 B2
APPLICATION NO. : 11/131565
DATED : December 29, 2009
INVENTOR(S) : Ramani Narayan and Yogaraj Nabar It is certified that error appears in the above-identified patent and that said Letters Patent is hereby corrected as shown below:

Column 5, line 25, "  " should be

-- 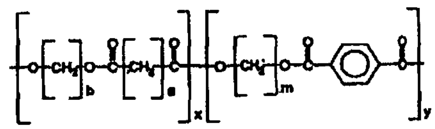 --.

Column 6, line 33, "  " should be

-- 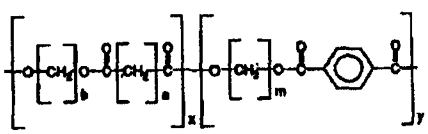 --.

Column 7, line 43, " 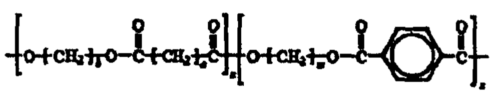 " should be

-- 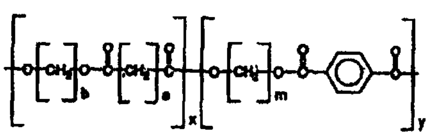 --.

Column 18, line 25, "vet port" should be --vent port--.

Signed and Sealed this
Seventeenth Day of April, 2012

David J. Kappos
*Director of the United States Patent and Trademark Office*

Column 22, line 6, Claim 1, “ 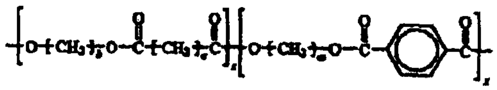 ” should be
-- 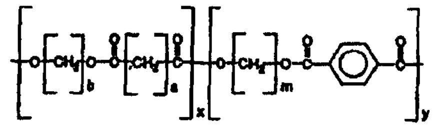 --.
Column 23, line 9, Claim 17, “ 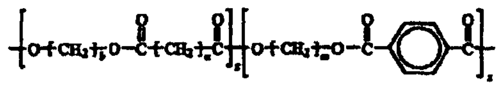 ” should be
-- 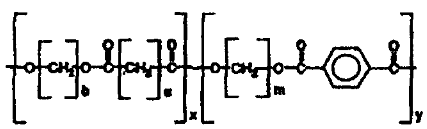 --.